United States Patent [19]  [11]  4,443,558
Gibson  [45]  Apr. 17, 1984

[54] HIGHLY STABLE HYDROPROCESSING CATALYST

[75] Inventor: Kirk R. Gibson, El Cerrito, Calif.

[73] Assignee: Chevron Research Company, San Francisco, Calif.

[21] Appl. No.: 366,740

[22] Filed: Apr. 8, 1982

[51] Int. Cl.³ .............................................. B01J 23/84
[52] U.S. Cl. ..................................... 502/314; 502/313
[58] Field of Search ......................................... 252/465

[56] References Cited

U.S. PATENT DOCUMENTS

| | | | |
|---|---|---|---|
| 2,499,255 | 2/1950 | Parker | 252/465 |
| 3,075,915 | 1/1963 | Arnold et al. | 252/465 |
| 3,894,966 | 7/1975 | Conway | 252/465 |

Primary Examiner—Delbert E. Gantz
Assistant Examiner—Lance Johnson
Attorney, Agent, or Firm—D. A. Newell; S. R. LaPaglia; D. P. Freyberg

[57] ABSTRACT

The method of making a catalyst comprising alumina with GP VI and VIII components wherein the method comprises peptizing an alumina powder with an aqueous acid solution of a group VIII metal salt, neutralizing the peptized alumina/group VIII metal with an aqueous solution of a nitrogen-containing base with a dissolved group VI metal salt therein, extruding, drying, and calcining the catalytic particles.

12 Claims, 1 Drawing Figure

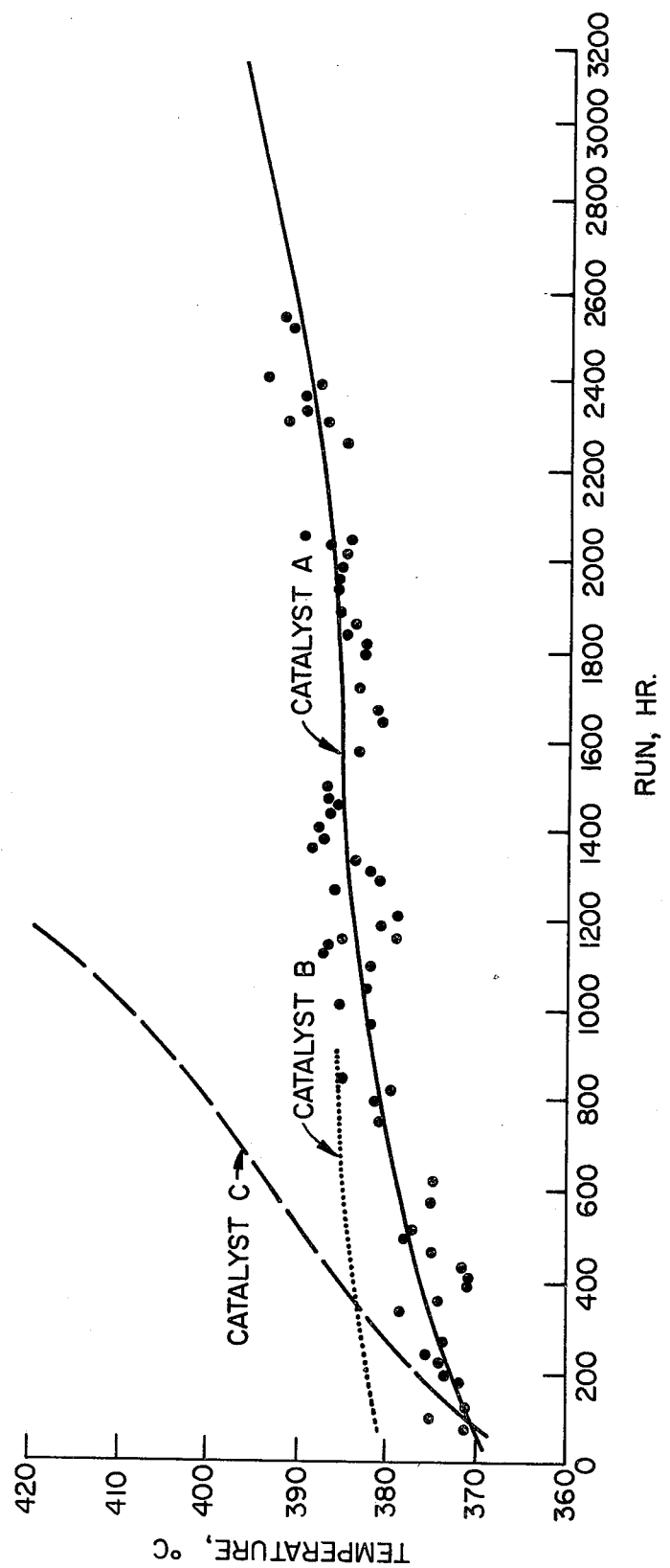

HIGHLY STABLE HYDROPROCESSING CATALYST

BACKGROUND OF THE INVENTION

This invention relates to hydroprocessing catalysts and methods of producing hydroprocessing catalysts, particularly alumina supported, high surface area, small pore diameter, molybdenum and cobalt or nickel hydroprocessing catalysts made by comulling methods.

It is widely appreciated in the field of petroleum processing that catalysts comprising a Group VIB and Group VIII metal component on an alumina base give superior hydroprocessing results. Such catalysts can be made by any of several methods, including cogellation (see U.S. Pat. No. 3,546,105) oil drop methods (see U.S. Pat. No. 3,873,470) impregnation of preformed alumina supports (see U.S. Pat. No. 4,113,661) and mulling support and metals.

SUMMARY OF THE INVENTION

A catalyst is provided suitable for hydroprocessing hydrocarbonaceous feedstocks. This catalyst is made by the method of peptizing an alumina powder with an acid aqueous solution of a soluble Group VIII metal salt, neutralizing the peptized alumina with an aqueous solution of a nitrogen-containing base having a soluble Group VI metal salt dissolved therein. The neutralized alumina mass is extruded, dried and calcined at a temperature of not less than 650° C. for a period of time not less than one hour.

The catalyst of this invention, made by the method above, will be characterized by having from 2.5 to 8 weight percent Group VIII metal, between 10 to 20 weight percent Group VI metal, a skeletal density of at least 3.4 gram/cubic centimeter, a surface area of at least 200 meters$^2$/gram, a crush strength of at least 10 kilograms/centimeter and a calculated geometric pore diameter of between 40 Å and 110 Å. Cobalt and nickel are the preferred Group VIII metals and molybdenum is the preferred Group VI metal.

DESCRIPTION OF THE DRAWING

The drawing shows the run lives of 3 catalysts compared to temperature.

DETAILED DESCRIPTION

Cobalt molybdenum and nickel molybdenum alumina supported catalysts are used for a wide variety of hydroprocesses, including reforming, hydrocracking, hydrodenitrification, hydrodesulfurization, and hydrodemetalation.

Pore sizes, catalytic metals loadings, catalyst particle sizes supports and the like are varied to tailor the catalyst as closely as possible to the expected use. Catalysts are being used more for hydroprocessing low quality feedstocks, particularly crude oils and residua, to upgrade the feedstock to a product that can be conventionally refined, and for processing of synthetic fuels including catalytic coal liquefaction processes. Feedstocks in particular need of catalytic upgrading are those that contain 100 ppm metals, particularly nickel, iron and vanadium, to as high as 1000 ppm metals or more in low quality residua. Sulfur content can be as high as several weight percent. Both the metals and sulfur are frequently concentrated in what is termed the asphaltene fraction of the feedstock, which is conventionally defined as the heptane insoluble portion of the feedstock. Asphaltenes are large agglomerations ranging in size to larger than 200 Å. One approach to upgrading these feedstocks is to contact the feedstock with several catalysts in turn, for example, a less active, larger-pored catalyst, and then a more active, smaller-pored catalyst.

The feedstock to be upgraded by the catalyst of the present invention will usually be one that has been hydrotreated by some other catalyst; for example, a macroporous hydroprocessing catalyst to remove metals.

The catalyst of this invention has been found to have a surprisingly long life when processing feedstocks high in metals and sulfur. Although the catalyst of this invention performs very well at removing metals from feedstocks, it is also useful as the catalyst in catalytic coal liquefaction, shale oil upgrading and in distillate hydroprocessing.

While not primarily a demetalation or guardbed-type catalyst, the catalyst of this invention has a surprisingly long life when removing metals from the feedstock.

The catalyst particles of this invention have a large surface area, over 200 m$^2$ preferably over 220 m$^2$, and a small calculated micropore diameters, between 40 Å to 110 Å, preferably between 50 Å and 80 Å and essentially no macropores, defined herein as pores larger than 1000 Å. Calculated pore-diameter is the diameter that the pores of the catalyst would have, if they were circular, and is calculated from the following equation:

$$\text{Calculated Micropore Diameter} = \frac{4 \times PV \times 10^4}{SA}$$

where PV is pore volume calculated by the equation:

$$PV = \frac{1}{\text{partical density}} - \frac{1}{\text{skeletal density}},$$

expressed in cubic centimeters per gram, SA is nitrogen absorption surface area and the result is in units of Angstroms.

The catalytic metals of this invention are Group VI and Group VIII metals, preferably molybdenum and cobalt or nickel. In particular the support will contain between 10 and 20 percent of Mo and between 2.5 and 8 percent of Co or Ni. Percent herein refers to weight percentage of metals as reduced metals.

The preferred source of nickel or cobalt is selected from the group of cobalt nitrate cobalt sulfate, cobalt oxide, cobalt acetate, cobalt chloride, nickel acetate, nickel chloride, nickel nitrate, nickel sulfate, and nickel oxide. The preferred source of molybdenum is selected from the group consisting of ammonium molybdate, molybdenum oxide and phosphomolybdic acid. The catalyst particles of the present invention are characterized by having no detectable cobalt molybdate or nickel molybdate when measured by powder X-ray diffraction techniques, indicating superior dispersion of the catalytic metals throughout the alumina support, and implying high intrinsic activity. This technique can detect crystals as small as 30 Å.

The support of the catalyst particles of this invention is alumina. Any of the various commercially available catalytic aluminas can be used, including Catapal ® Alumina obtainable from Conoco.

The catalyst is made by peptizing the alumina in an acid containing one of the catalytic metals and adding the second metal dissolved either in an alkaline neutralizing solution or dissolved in a neutral solution. The preferred method of making this catalyst is peptizing the solution with an acidic solution, for example nitric, acetic, formic, oxalic, sulfuric, or hydrochloric, having a soluble nickel or cobalt salt, for example nickel acetate dissolved therein. The alumina is mixed in this solution until it is a pliable dough and a molybdenum solution made from, for example, $MoO_3$ and concentrated $NH_3OH$ is added. After more mixing, about 30 minutes in a Baker-Perkins mixer, at 20° C. the doughy neutralized alumina is extruded.

It has been found that the amount of water in the doughy mixture to be extruded is important to achieving a small pore catalyst having a unimodal pore size distribution. In particular, the mixture should have about 30% by weight free water content before extrusion. This can result in a mixture that would typically be regarded as too runny to extrude, but a drier mixture tends to result in a bimodal pore size distribution.

The shape chosen for the extrusion can be important. Frequently ease of preparation of extrusion dies dictates round shapes. It is preferred that the neutralized alumina be extruded through dies of non-circular shape. It has been found from studies of sectioned catalyst particles that demetalation reactions tend to be diffusion limited, and the metals removed from the feedstock tend to be deposited at certain critical distances in the particle. There is a central volume of catalyst material that may not be effectively used. Shapes that reduce the distance from the surface of the catalyst to all points in the interior while still maintaining satisfactory pressure drop across a bed of the catalyst are preferred. Preferred non-circular shapes include trilobal, quadralobal, oval, oval with bumps and the like.

The extruded particles are dried before calcination at a temperature not exceeding 250° C. for a period of time not exceeding 4 hours. The dried particles are then calcined at a temperature of not less than 650° C., preferably not less than 675° C. for a period of time not less than 1 hour.

Conventional impregnated catalysts are frequently made by premaking the support and calcining it, then impregnating the support. After the catalytic metals are impregnated into the support, the resultant mass must be calcined. Generally, the calcination procedure is a long process where the temperature of the calcination is slowly raised. It is known that rapid calcination, that is a calcination directly at the final highest temperature, tends to sinter the catalytic metals onto the support and create high levels of crystalline cobalt or nickel molybdate, reducing the activity of the catalyst. It has been found that when the comulled catalyst of the present invention is calcined directly at the highest temperature, 650° C., the activity, rather than decreasing, seems to increase. The air flow during calcination can be high, for a dry atmosphere, or low, which results in moderate steaming, thereby enlarging pores.

Catalyst particles can be characterized by other parameters including density. The preferred density of the particles of this invention is between 1.2 and 1.6 and the preferred skeletal density, that is, the value equal to:

$$\frac{\text{mass of particle}}{\text{volume of particle} - \text{pore volume}}$$

is at least 3.4 g/cc preferably 3.6 g/cc. The particle density is well within conventional limits, but the skeletal density is somewhat higher than conventional particles. The crush strength of the catalyst particles of this invention is high, typically between 10 and 20 kilograms/centimeter, and the attrition of the particles is low, between 0.5 and 2.5% for 50 grams of catalyst in a drum of about 20 cm rotated at 60 revolutions per minute for 30 minutes, where attrition is the percent of catalyst that passes through a smaller mesh than the catalyst particle size.

Feedstocks preferable for conversion by this catalyst include those that have been subjected to some previous hydroprocess, for example, residua that have been at least preliminarily demetalized or feedstocks that have been hydrocracked. An especially advantageous use involves the passing of crude oil or residua over a plurality of catalyst beds, each containing different catalysts. For example, the feedstock may be contacted with a first catalyst, a low metals loaded catalyst, with about 1 weight percent to Co and about 3 weight percent Mo, and about 20 percent of its pore volume in macropores, herein macropores are defined as pores greater than 1000 Å, then contacted with a second catalyst, a higher metals loaded catalyst, for example about 3 percent Co and about 10 percent Mo, with very little pore volume in macropores; and then contacted with a third catalyst, the catalyst described herein.

In such a process the feedstock that is processed by the catalyst of this invention is one that has been hydrotreated before contacting the catalyst. In such a three-stage demetalation/desulfurization process the metals that would plug the pores of this catalyst tend to be removed before the feedstock contacts the catalyst.

The catalyst of this invention will operate under conventional generic hydrogen treating conditions. The precise conditions can be tailored by one skilled in the art to accomplish the service desired.

Generic hydrogen treating conditions include a reaction zone temperature in the range from about 200° C. to 540° C., a total pressure in the range from about 1 atmosphere to about 300 atmospheres, with a hydrogen partial pressure of from 0 to 200 atmospheres, a hydrogen-to-oil feed ratio of from 0 to 100,000 standard cubic feet per barrel, and a liquid hourly space velocity (LHSV) of about 0.1 to about 25 volumes per hour per volume. When the catalyst of this invention is used for hydroprocessing of residua the conditions include a temperature in the range of between 340° to 450° C., about 100 to 200 atmospheres total pressure with a recycle rate of hydrogen of 2000 to 10,000 standard cubic feet/barrel and a space velocity of 0.2 to 0.6. Distillate hydroprocessing typically requires conditions of between 370° to 430° C. about 40 to 70 atmospheres pressure and as high as 140 atmospheres pressure, with recycle rates of 3000 to 6000 standard cubic feet/barrel and space velocities as low as 1 but preferably in the range of 2 to 2.5.

EXAMPLES

Example 1

This example provides a method for making a catalyst of this invention, hereinafter Catalyst A.

A solution was prepared by mixing 200 grams of nickel acetate [$Ni(C_2H_3O_2)_2.4H_2O$] in 475 ml of water. This solution was mixed with a second solution made from 25 grams of concentrate nitric acid and 50 ml of water. The acidic nickel containing solution was added at a rate of 50 ml/min to 1000 grams of Catapal® alumina. After the additions and 20 minutes of mixing, 480 ml of a neutralizing solution made by dissolving 65.10 grams of MoO₃ in 67.72 milliliters of 30% NH₄OH and 10,172 milliliters of distilled water was added at 50 ml/min. After addition and 20 minutes more mixing the plastic mass was extruded and dried at 250° F. for 2 hours and then 400° F. for 2 hours more and calcined at 1200° F. for 1 hour in dry air.

Example 2

This example shows the preparation of another catalyst of this invention, Catalyst B.

An acidic solution made from a first solution of 150 grams of Nickel Acetate dissolved in 475 milliliters of water and a second solution of 25 grams concentrated nitric acid in 50 milliliters of water was added at a rate of 50 milliliters per minute, to 1000 grams of alumina in a small Baker-Perkins mixer at 50° C. This solution was added and the resultant mass mixed for 20 minutes before an alkaline solution made from 12 ml of 58 volume percent NH₄OH and 350 ml of a molybdenum solution made in the proportions of 17.4 grams of MoO₃ in 17.2 milliliters of 30 volume % NH₄OH and 26 milliliters of distilled water, and 400 milliliters of distilled water. The alkaline solution was added at 50 ml/minute, and the neutralized mass was mixed for another 20 minutes. The mass was extruded in an oval shape with bumps and the extrudate dried at 120° C. for 2 hours and 200° C. for an additional 2 hours. The dried material was calcined at 650° C. for 2 hours under a slow air flow thereby providing an atmosphere not completely dry.

Example 3

A catalyst, hereinafter C, was prepared according to the procedure described in U.S. Pat. No. 4,113,661 issued to P. W. Tamm, Sept. 12, 1978, entitled, "Method for Preparing a Hydrodesulfurization Catalyst". An 80/20 by weight mixture of Catapal ®, made by Conoco, alumina and Kaiser alumina are sized in the range below about 150 microns and treated by thoroughly admixing the mixed powders with an aqueous solution of nitric acid, where for each formula weight of the alumina (Al₂O₃) about 0.1 equivalent of acid is used. The treated alumina powder is in the form of a workable paste. A sample of this paste completely disperses when one part is slurried in four parts by weight of water. The pH of the slurry is in the range of about 3.8 to about 4.2, usually about 4.0. After aqueous acid treatment of the powders, aqueous ammonium hydroxide is thoroughly admixed into the paste in an amount equivalent to about 80% of the ammonium hydroxide theoretically required to completely neutralize the nitric acid; that is, about 0.08 equivalent of the hydroxide is added to the paste per formula weight of the alumina present. The ammonium hydroxide used is desirably about an 11% by weight solution because the volatile material evolved during drying and calcination content of the treated and neutralized solids should be in the range of 50 to 70 weight percent. With the addition and thorough admixing of ammonium hydroxide, the paste changes to a free-flowing particulate solid suitable as a feed to an extruder. The extruder has a die plate that will extrude shaped particles of about 1/16 inch. The extrudate precursor is freed of loosely-held water by an initial moderate drying step, for example, at a temperature in the range of 75° C. to 250° C. The preparation of the carrier is then completed by calcining the dried extrudate at a temperature between 250° C. to 850° C. in a dry or humid atmosphere. The resulting carrier has a pore volume of about 0.7 cc per gram, of which at least about 85% is furnished by pores having a diameter in the range between about 80 and 150 Å.

Example 4

This example shows the difference in activity between the catalyst of this invention and conventional catalysts.

Referring to the drawing, the run lives of three catalysts designated A, B, and C are compared on a plot of temperature required to achieve product quality versus time of run. When the temperature required is 420 C.°, the end of run has been reached.

Referring to the drawing, the solid line represents the behavior of Catalyst A. Catayst A, a catalyst of this invention, has a calculated geometric pore size of about 65 Å and contains 5.6 weight percent nickel and 15.3 weight percent Mo, when weight percent is calculated as weight of reduced metal. The scatter of points represents the actual temperatures, the line is an average.

The dotted line represents the average behavior of Catalyst B. Catalyst B, another catalyst of this invention has a calculated geometric pore size of about 100 Å and contains 4.2 weight percent nickel and 11.4 weight percent molybdenum.

The dashed line represents the average behavior of a standard, Catalyst C. Catalyst C is a comparative catalyst known to give superior results in desulfurization service. It has a calculated average pore size of about 140 Å and contains 3% weight percent cobalt and 11% weight percent molybdenum. Catalyst C was chosen because it was initially believed that it would give superior service as a demetalation catalyst. As the plot clearly demonstrates, Catalyst A gives superior results after 3200 hours, whereas Catalyst C was deactivated after 1150 hours. Catalyst B shows that the initial conditions of its service must be more severe than Catalyst A, presumably because of less catalytic metals and larger pores, but it deactivates at a rate comparable to Catalyst A.

The initial temperature for both Catalyst A and C was nearly the same, about 370° C. Catalyst C fouled much more rapidly, however, and reached 420° C. after about 1150 hours. Catalyst A reached a plateau between after about 800 hours and to about 2000 hours at a temperature that ranged between 375° C. and 385° C., and had reached only 400° C. after 3200 hours. Catalyst B, which was similar to Catalyst A, except it had slightly larger pore size and less metal, showed very similar behavior to Catalyst A until 900 hours, when the test was terminated before end of run. Catalyst B showed about the same rate of fouling, but had a startup temperature slightly higher.

It is not clearly understood why Catalysts A and B are so much more active than Catalyst C. It had been assumed that the smaller pores of Catalysts A and B would plug, due to metals deposition, therefore deactivating sooner. One possible explanation is the calcination conditions of Catalysts A and B. Impregnated Catalysts, such as Catalyst C, are rarely calcined at severe conditions to avoid sintering of the metals and formation of large nickel or cobalt molybdate crystals. Based on the data from Catalyst C and other impregnated catalysts, it is surprising that Catalysts A and B exhibit any stability at all, and even more surprising they demonstrate such enhanced stability.

What is claimed is:

1. The method of making a catalyst for hydroprocessing hydrocarbonaceous feedstocks comprising:

peptizing an alumina powder with an acid aqueous solution of a Group VIII metal salt;

neutralizing said peptized alumina with an aqueous solution of a nitrogen containing base having a soluble Group VI metal salt dissolved therein;

extruding particles of said neutralized alumina;

drying said extruded particles; and calcining the dried particles.

2. The method of claim 1, wherein said acid aqueous solution of a Group VIII metal salt contains an acid selected from the group consisting of nitric, sulfuric, formic, acetic, oxalic, and hydrochloric acids.

3. The method of claim 1 wherein said nitrogen containing base is ammonia.

4. The method of claim 1 wherein neutralized alumina is extruded through dies of non-circular shape.

5. The method of claim 4 wherein said dies are of trilobal shape.

6. The method of claim 4 wherein said dies are of oval shape.

7. The method of claim 1 wherein said extruded particles are dried at a temperature not exceeding 250° C. for a period of time not exceeding 4 hours.

8. The method of claim 1 wherein said Group VIII metal salt includes salts selected from the group consisting of cobalt nitrate, cobalt sulfate, cobalt oxide, cobalt acetate, cobalt chloride, nickel acetate, nickel nitrate, nickel sulfate, nickel oxide and nickel chloride.

9. The method of claim 1 wherein said Group VI metal is molybdenum.

10. The method of claim 9 wherein said molybdenum salt includes salts selected from the group consisting of ammonium molybdate, molybdenum oxide, phosphomolybdic acid.

11. The method of claim 1 wherein said neutralized alumina contains at least 30 weight percent added liquid.

12. The method of claim 1 wherein said dried particles are calcined at temperatures of not less than 675° C. for at least one hour.

* * * * *